United States Patent
Tiwari et al.

(10) Patent No.: US 10,513,978 B2
(45) Date of Patent: Dec. 24, 2019

(54) DIRECTED FLOW NOZZLE SWIRL ENHANCER

(71) Applicant: General Electric Company, Schenectady, NY (US)

(72) Inventors: Prashant Tiwari, West Chester, OH (US); Shiladitya Mukherjee, West Chester, OH (US); Clark George Wiberg, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 331 days.

(21) Appl. No.: 15/143,770

(22) Filed: May 2, 2016

(65) Prior Publication Data

US 2017/0314467 A1    Nov. 2, 2017

(51) Int. Cl.
*F02C 7/047* (2006.01)
*B64D 15/04* (2006.01)
*B64D 33/02* (2006.01)

(52) U.S. Cl.
CPC .............. *F02C 7/047* (2013.01); *B64D 15/04* (2013.01); *B64D 2033/0233* (2013.01)

(58) Field of Classification Search
CPC ........ F02C 7/047; F02C 7/0047; B64D 15/00; B64D 15/04; B64D 33/00; B64D 33/02; B64D 2033/0233; B64D 2033/0286; F05D 2260/601; F05D 2260/14; F05D 2250/25; F01D 25/02
USPC ...................................... 60/39.093
See application file for complete search history.

(56) References Cited

U.S. PATENT DOCUMENTS

| | | |
|---|---|---|
| 2,125,445 A | 8/1938 | Holveck |
| 2,734,560 A | 2/1956 | Harris et al. |
| 3,401,888 A | 9/1968 | Sutter |
| 3,981,466 A | 9/1976 | Shah |
| 4,688,745 A | 8/1987 | Rosenthal |
| 5,088,277 A | 2/1992 | Schulze |
| 6,267,328 B1 | 7/2001 | Vest |
| 6,354,538 B1 | 3/2002 | Chilukuri |
| 6,442,395 B1 | 8/2002 | Refai et al. |
| 6,585,191 B2 | 7/2003 | Andre et al. |
| 7,185,833 B2 | 3/2007 | Geskin et al. |
| 7,575,196 B2 | 8/2009 | Chapman et al. |
| 7,870,721 B2 | 1/2011 | Winter et al. |
| 7,965,966 B2 | 6/2011 | Kim et al. |

(Continued)

FOREIGN PATENT DOCUMENTS

| | | |
|---|---|---|
| FR | 2 953 254 A1 | 6/2011 |
| WO | 2011/073561 A1 | 6/2011 |

(Continued)

OTHER PUBLICATIONS

Extended European Search Report and Opinion issued in connection with corresponding EP Application No. 17165901.4 dated Sep. 1, 2017.

*Primary Examiner* — Craig Kim
*Assistant Examiner* — Jacek Lisowski
(74) *Attorney, Agent, or Firm* — General Electric; James Reed

(57) ABSTRACT

An apparatus for improving heat transfer through a leading portion of an aircraft engine. The apparatus includes an annular channel that is defined by the leading portion. A source for gas that is fluidly connected to the channel and a narrow region that is defined within the annular channel.

8 Claims, 3 Drawing Sheets

(56) References Cited

U.S. PATENT DOCUMENTS

| | | | |
|---|---|---|---|
| 8,061,657 B2 * | 11/2011 | Rocklin | B64D 15/04 |
| | | | 138/116 |
| 8,082,726 B2 | 12/2011 | Cleft | |
| 8,338,975 B2 * | 12/2012 | Nyffenegger | F03B 13/00 |
| | | | 290/44 |
| 8,402,739 B2 | 3/2013 | Jain et al. | |
| 8,408,491 B2 | 4/2013 | Jain et al. | |
| 8,418,471 B2 | 4/2013 | Baltas | |
| 8,480,032 B2 | 7/2013 | Todorovic | |
| 8,967,543 B2 | 3/2015 | Saito et al. | |
| 9,193,466 B2 | 11/2015 | Calder et al. | |
| 2008/0267762 A1 | 10/2008 | Jain et al. | |
| 2013/0247584 A1 * | 9/2013 | Kasibhotla | F01D 25/12 |
| | | | 60/782 |
| 2016/0017751 A1 * | 1/2016 | Caruel | F02C 7/047 |
| | | | 415/175 |

FOREIGN PATENT DOCUMENTS

| | | |
|---|---|---|
| WO | 2011/073565 A2 | 6/2011 |
| WO | 2014155009 | 10/2014 |

* cited by examiner

DIRECTED FLOW NOZZLE SWIRL ENHANCER

BACKGROUND OF THE INVENTION

The present invention relates to heating components of an aircraft engine and more particularly to heating the leading edge of an aircraft engine.

The accretion or buildup of ice on an aircraft engine is undesirable. In order to reduce ice buildup, it is known to introduce heated fluid from one part of an engine to the other components of the engine. One problem with these methods is that distributing thermal energy evenly throughout the part to be heated is difficult. As a result, either ice buildup happens on portions of the component that are not heated sufficiently or additional fluid flow from another part of the engine is needed to provide the required thermal load. Such an increase in fluid flow reduces efficiency of the engine. Accordingly, there is a need for an apparatus to more efficiently use fluid flow to heat an aircraft component.

BRIEF DESCRIPTION OF THE INVENTION

This need is addressed by a structure within the component to be heated that is configured to increase the heat transfer coefficient within the component.

According to one aspect of the present invention there is provided an apparatus for improving heat transfer through a leading portion of an aircraft engine. The apparatus includes an annular channel that is defined by the leading portion. A source for gas that is fluidly connected to the channel and a narrow region that is defined within the annular channel.

According to another aspect of the present invention there is provided an aircraft engine nacelle configured to provide improved heat transfer from fluid within the nacelle through a wall of the nacelle. The nacelle includes a D-duct defined by the wall. A source of heated fluid is fluidly connected to the D-duct. A narrowed region is defined within the D-duct.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
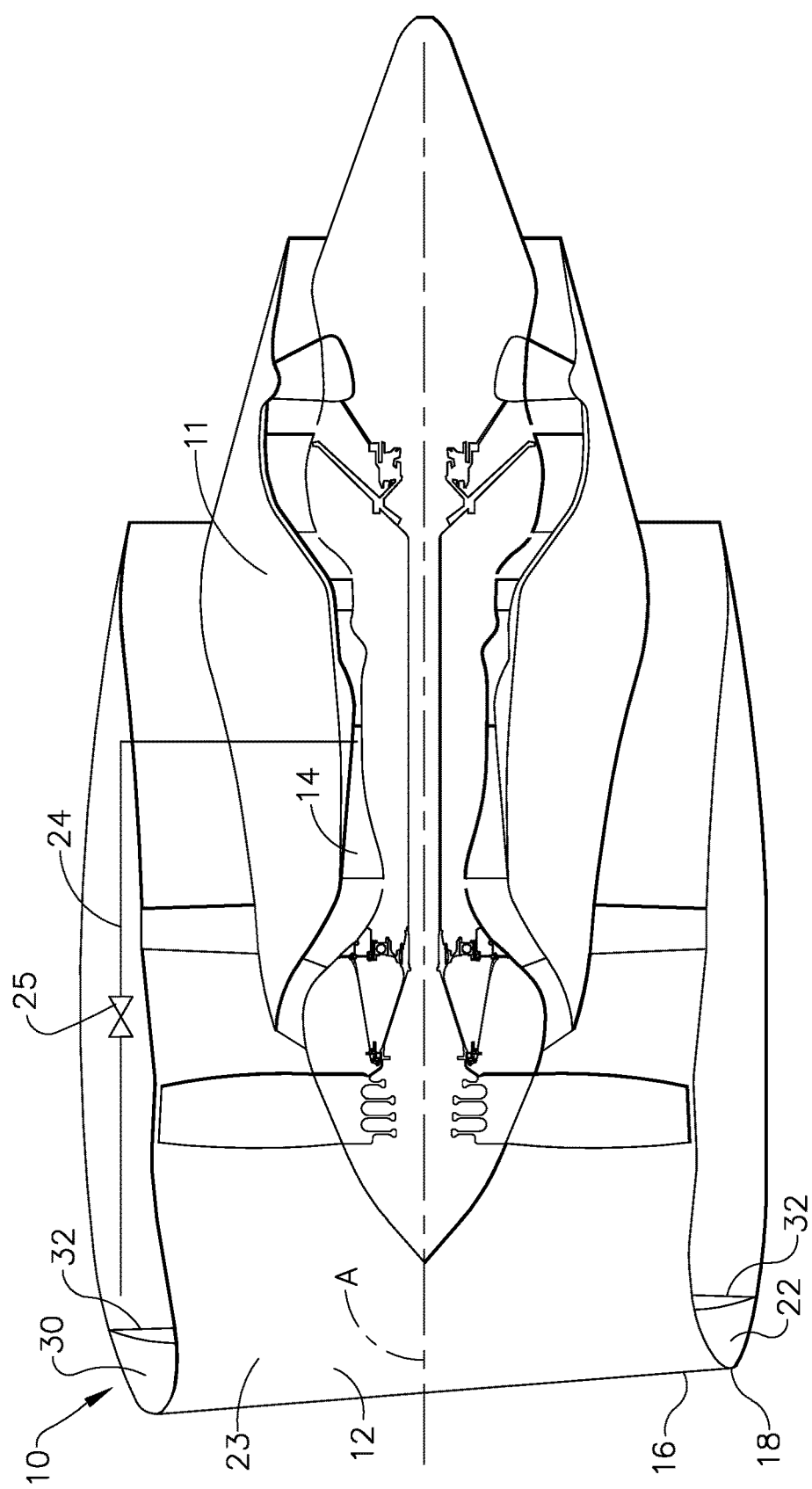
FIG. 1 shows a partially cutaway view of an aircraft engine having a nacelle that defines a D-duct.

Referring to the drawings wherein identical reference numerals denote the same elements throughout the various views, FIG. 1 shows a partially cutaway view of a nacelle 10 that defines the leading portion of an engine 11. The nacelle 10 has a D-duct 30 defined therein. The D-duct 30 is configured to increase the speed of gas introduced into it such that the gas can circulate around the entire circumference of the D-duct 30.

The nacelle 10 of the engine 11 has a wall 16 that has an inner surface 22 and an outer surface 23. The outer surface 23 of the wall 16 defines an inner lip 12 and an outer lip 18. The inner surface 22 defines the D-duct 30 in conjunction with a D-duct-floor 32.

Figure 2:
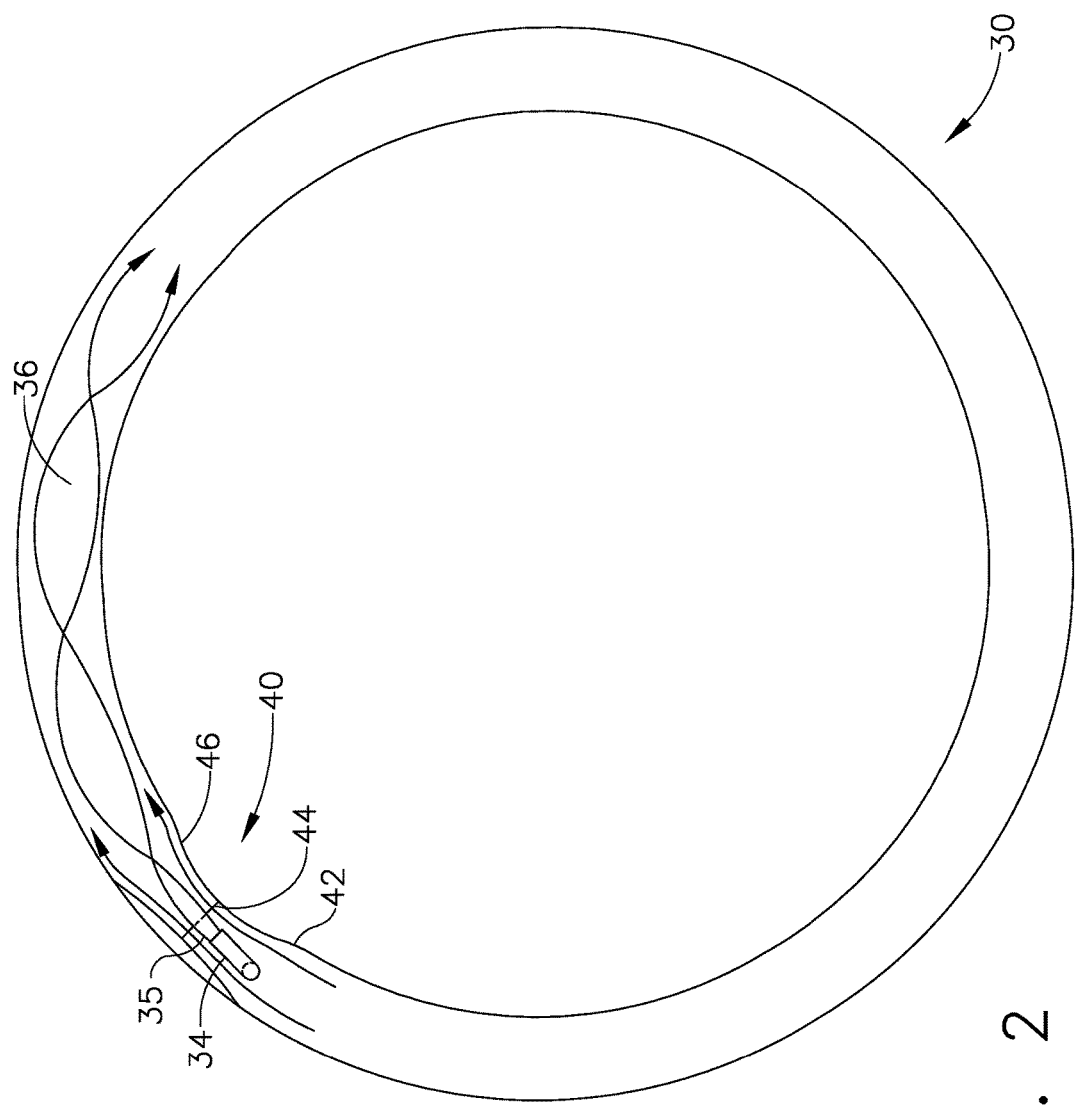
FIG. 2 shows a circular representation of an internal portion of the engine shown in FIG. 1 that depicts the interior wall surfaces that define the D-duct.

The D-duct 30 is an annular chamber defined by the inner surface 22 of the wall 16 that is positioned around an axis A of the engine 11. As shown, the D-duct 30 has a D-shaped cross-section. As shown in FIG. 2, a directional flow nozzle 34 extends into the D-duct 30. The directional flow nozzle 34 is fluidly connected to a source of heated gas from the engine 11 (e.g. a compressor 14) via a conduit 24. A valve 25 is positioned in conduit 24 between the engine 11 and the directional flow nozzle 34. The valve 25 is configured to control the flow through the conduit 24 to the directional flow nozzle 34.

Figure 3:
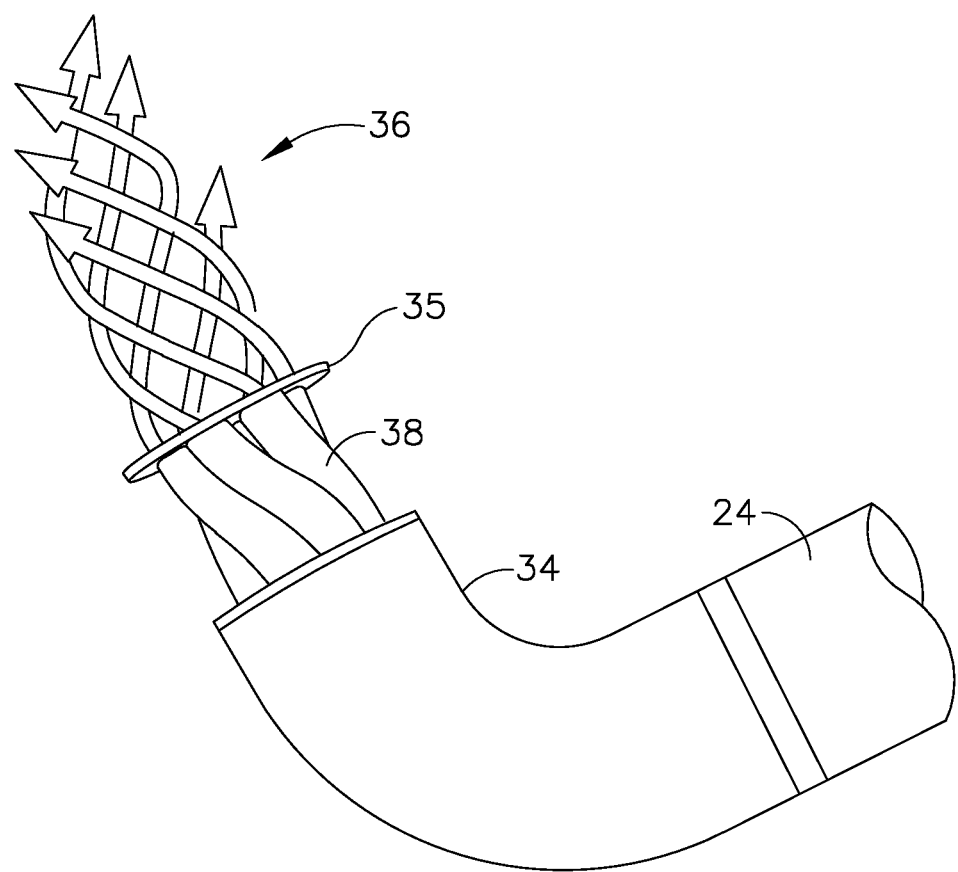
FIG. 3 shows a directional flow nozzle.

Referring now to FIG. 3, the nozzle 34 is configured to impart a rotational flow as the heated fluid, or gas such as bleed air, moves inside the nozzle 34. In one embodiment the nozzle 34 contains a plurality of fluid flow passages 38 twisted in a helical pattern. In the preferred embodiment four to six fluid flow passages 38 are used, however in other embodiments the number of passages could be substantially more or less. Additionally other means may be used to cause the rotation including but not limited to internal vanes or nozzles. As the hot gas moves inside the nozzle 34 the fluid flow passages 38 impart a rotational movement to the gas and then eject it out of the discharge end 35 into the D-duct 30. It will be recognized that the injection of the heated fluid stream into the housing air will cause the entrained mass of air to rotate within the D-duct 30 in a swirling rotational direction. A suitable exhaust means, such as suitably sized holes formed in an outboard position of the nose lip D-duct 30, permit a portion of such entrained air to escape the D-duct 30 equal to the mass flow rate of heated fluid being injected into the D-duct 30 to maintain an equilibrium of flow.

It should be appreciated that the nacelle 10 and the D-duct 30 can be shapes other than circular such as, but not limited to, elliptical. It should also be appreciated that the cross-section of the D-duct 30 can be similar to that of the nacelle 10 but it can also be different.

As can be seen in FIG. 2, the heated fluid introduced from the directional flow nozzle 34 is directed around the D-duct 30. The directional flow nozzle 34 includes a discharge end 35. In the illustrated embodiment, the heated fluid is introduced in a swirling pattern that defines a swirl zone 36 that extends from the discharge end 35. It should be appreciated that the heated fluid introduced into the D-duct 30 can exhibit a flow pattern other than swirling. Such other flow patterns can be defined by the dimensions of the directional flow nozzle 34.

The D-duct 30 has a generally consistent cross-sectional width and defines a passageway for fluid flow from directional flow nozzle 34. However, as shown in FIG. 2, the D-duct 30 includes a narrowed region 40. The narrowed region 40 includes an inlet 42, a neck 44, and an outlet 46. The dimensions of the narrowed region 40 at the inlet 42 and the outlet 46 are substantially the same as that of the rest of the D-duct 30. The narrowed region 40 tapers from the inlet 42 to a narrower dimension at the neck 44. The narrowed region 40 expands, or diverges, from the neck 44 to the outlet 46.

The directional flow nozzle 34 is positioned such that the discharge end 35 of the directional flow nozzle 34 is positioned upstream of the outlet 46 of the narrowed region 40. More preferably, the directional flow nozzle 34 is positioned upstream of the neck 44 and downstream of the inlet 42 of the narrowed region 40. Thus the directional flow nozzle 34 is positioned to discharge heated fluid into the D-duct 30 such that heated fluid from the directional flow nozzle 34 expands as it moves away from the neck 44 toward the outlet 46. In one embodiment, the discharge end 35 is positioned near the inlet 42 such that heated fluid discharged from the nozzle 34 is directed into the narrowed region 40 and accelerates as it flows toward the neck 44.

The narrowed region 40 is configured such that movement of heated fluid from the directional flow nozzle 34 through the narrowed region 40 creates a lower pressure near the inlet 42 than at the outlet 46 of the narrowed region 40. Thus the narrowed region 40 in combination with position of the directional flow nozzle 34 is configured to create a pressure differential within D-duct 30 to enhance flow around the ring 30 from discharge end 35 of the directional flow nozzle 34 toward the inlet 42 of the narrowed region 40.

The nacelle 10 can be better understood by description of the operation thereof. Heated fluid is introduced into the D-duct 30 by the directional flow nozzle 34. Preferably, when the discharge end 35 of the directional flow nozzle 34 is positioned upstream of the inlet 42, the heated fluid is compressed within the narrowed region 40. The introduced fluid expands as it moves away from the neck 44 and out of the narrowed region 40 through the outlet 46. The flow of heated fluid around D-duct 30 is driven by the difference in pressure within the D-duct 30 between the outlet 46 and the inlet 42 of the narrowed region 40.

The present invention has advantages over the prior art. The narrowed region 40 described above is configured to increase the velocity of heated fluid. In this manner the heated fluid is accelerated to a velocity that is sufficient to move the heated fluid all of the way around the D-duct and as a result improving the thermal distribution within the D-duct. The improved thermal energy distribution increases effectiveness in keeping the nacelle inner lip ice-free will mitigating hotspots on the outer live region. Thus the nacelle inner lip is kept ice-free with less use of expensive heated fluid flow. As a result the D-duct having a compressed section of the present invention improves the overall efficiency of the engine to make it more competitive in the marketplace.

The foregoing has described an apparatus configured to provide improved heat fluid flow around the nacelle D-duct of an aircraft engine and all features described herein of this invention (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. An aircraft engine nacelle configured to provide improved heat transfer from gases within the nacelle through a wall of the nacelle, the nacelle comprising:

a D-duct having an annular chamber defined by an inner surface of the wall that extends about an axis, the wall being defined by a radial inner wall and a radial outer wall;

a directional flow nozzle extending into the annular chamber, the directional flow nozzle having a discharge end and is configured to impart a rotational flow to a fluid flowing therethrough; a source of heated fluid fluidly connected to the directional flow nozzle; wherein a portion of the radial inner wall is indented in a radial direction away from the axis; a narrowed region that is defined by the indented portion of the radial inner wall, the narrowed region having an inlet, an outlet, and a neck formed by the indented portion of the radial inner wall and positioned between the inlet and outlet, wherein the discharge end of the directional flow nozzle is positioned upstream of the outlet of the narrowed region such that position of the discharge end in combination with the narrowed region creates a lower pressure near the inlet of the narrowed region than at the outlet of the narrowed region, thereby creating a pressure differential within the annular chamber to move the heated fluid around the annular chamber from the discharge end of the directional flow nozzle toward the inlet of the narrowed region, wherein the heated fluid is discharged directly into the narrowed region.

2. The nacelle according to claim 1, wherein each of the inlet and outlet of the narrowed region includes a taper from a first width that is equal to adjacent portions of the D-duct.

3. The nacelle according to claim 1 wherein the discharge end of the nozzle is positioned upstream of the neck of the narrowed region.

4. The nacelle according to claim 1, wherein the nozzle includes six flow passages twisted in a helical pattern.

5. A method for heating an aircraft engine nacelle, the method comprising the steps of:

inserting a directional flow nozzle into an annular chamber of the aircraft engine nacelle, the annular chamber extending about an axis and having a narrowed region, wherein a portion of the radial inner wall is indented in a radial direction away from the axis; the narrowed region defined by the indented portion of the radial inner wall of the annular chamber and including an inlet, an outlet, and a neck disposed between the inlet and outlet, the neck being formed by the indented portion of the radial inner wall;

positioning a discharge end of the directional flow nozzle upstream of the outlet to create a lower pressure near the inlet than at the outlet of the narrowed region, thereby creating a pressure differential within the annular chamber;

using the directional flow nozzle to introduce a heated fluid into the annular chamber of the aircraft engine nacelle, the heated fluid being discharged directly into the narrowed region; and using the pressure differential within the annular chamber to move the heated fluid around the annular chamber from the discharge end of the directional flow nozzle toward the inlet of the narrowed region such that the heated fluid flows all the way around the annular chamber.

6. The method according to claim 5, wherein the directional flow nozzle is configured to impart rotational flow to the heated fluid.

7. The method according to claim 6, wherein the nozzle includes a plurality of flow passages twisted in a helical pattern.

8. The method according to claim 7, wherein the nozzle includes six flow passages.

* * * * *